United States Patent
Finn et al.

(10) Patent No.: US 9,960,476 B2
(45) Date of Patent: *May 1, 2018

(54) SMART CARD CONSTRUCTIONS

(71) Applicants: David Finn, Tourmakeady (IE); Mustafa Lotya, Celbridge (IE); Darren Molloy, Galway (IE)

(72) Inventors: David Finn, Tourmakeady (IE); Mustafa Lotya, Celbridge (IE); Darren Molloy, Galway (IE)

(73) Assignee: Féinics AmaTech Teoranta, Lower Churchfield, Tourmakeady, Co. Mayo (IE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/358,138

(22) Filed: Nov. 22, 2016

(65) Prior Publication Data
US 2017/0077589 A1    Mar. 16, 2017

Related U.S. Application Data

(63) Continuation-in-part of application No. 15/331,821, filed on Oct. 22, 2016, now abandoned, and a continuation-in-part of application No. 15/072,356, filed on Mar. 17, 2016, now Pat. No. 9,836,684, application No. 15/358,138, which is a continuation-in-part of application No. 14/862,119, filed on Sep. 22, 2015, now Pat. No. 9,697,459, application No. 15/358,138, which is a continuation-in-part of application No. 15/197,795, filed on Jun. 30, 2016, now Pat. No. 9,812,782, which is a continuation-in-part of application No. 14/551,376, filed on Nov. 24, 2014, now Pat. No. 9,390,364, application No. 15/358,138, which is a
(Continued)

(51) Int. Cl.
G06K 19/06    (2006.01)
H01Q 1/22    (2006.01)
G06K 19/077    (2006.01)
H04B 5/00    (2006.01)

(52) U.S. Cl.
CPC ........ *H01Q 1/2225* (2013.01); *G06K 19/077* (2013.01); *H04B 5/0056* (2013.01)

(58) Field of Classification Search
CPC .......... G06K 19/06; G06K 5/00; G06K 19/00; G06K 19/02; G06F 17/00
USPC ........................ 235/492, 380, 375, 487, 488
See application file for complete search history.

(56) References Cited

U.S. PATENT DOCUMENTS

| | | | |
|---|---|---|---|
| 6,378,774 B1 * | 4/2002 | Emori | G06K 7/10178 235/441 |
| 2007/0096852 A1 * | 5/2007 | Lawrence | G06K 19/07 333/195 |

(Continued)

*Primary Examiner* — Edwyn Labaze
(74) *Attorney, Agent, or Firm* — Gerald E. Linden

(57) ABSTRACT

A conductive coupling frame (CF) or a discontinuous metal layer disposed surrounding and closely adjacent a transponder chip module (TCM), and substantially coplanar with an antenna structure (AS, CES, LES) in the transponder chip module (TCM). A metal card body (MCB, CB) or a transaction card with a discontinuous metal layer having a slit (S), extending from an inner end to a periphery of the metal layer, and not terminating in a distinct opening sized to accommodate a transponder chip module (TCM).

10 Claims, 10 Drawing Sheets

Related U.S. Application Data continuation-in-part of application No. 14/619,170, filed on Feb. 11, 2015, now Pat. No. 9,634,391, application No. 15/358,138, which is a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086.

(60) Provisional application No. 62/258,531, filed on Nov. 22, 2015, provisional application No. 62/371,768, filed on Aug. 7, 2016, provisional application No. 62/246,685, filed on Oct. 27, 2015, provisional application No. 62/300,906, filed on Feb. 28, 2016, provisional application No. 62/289,189, filed on Jan. 30, 2016, provisional application No. 62/281,209, filed on Jan. 21, 2016, provisional application No. 62/136,644, filed on Mar. 23, 2015, provisional application No. 62/150,307, filed on Apr. 21, 2015, provisional application No. 62/163,962, filed on May 19, 2015, provisional application No. 62/175,308, filed on Jun. 14, 2015, provisional application No. 62/201,578, filed on Aug. 6, 2015, provisional application No. 62/204,466, filed on Aug. 13, 2015, provisional application No. 62/044,394, filed on Sep. 1, 2014, provisional application No. 62/061,689, filed on Oct. 8, 2014, provisional application No. 62/080,332, filed on Nov. 16, 2014, provisional application No. 62/102,103, filed on Jan. 12, 2015, provisional application No. 62/088,598, filed on Dec. 7, 2014, provisional application No. 62/039,562, filed on Aug. 20, 2014, provisional application No. 62/035,430, filed on Aug. 10, 2014.

(56) References Cited

U.S. PATENT DOCUMENTS

| | | | |
|---|---|---|---|
| 2008/0106412 A1* | 5/2008 | Sakama | G06K 19/07749 340/572.1 |
| 2009/0242647 A1* | 10/2009 | Kim | G06K 19/07749 235/492 |
| 2013/0127573 A1* | 5/2013 | Nakano | G06K 7/10009 336/115 |
| 2016/0103065 A1* | 4/2016 | Lee | G01N 21/553 356/445 |
| 2016/0180212 A1* | 6/2016 | Herslow | G06K 19/07773 235/492 |

* cited by examiner

Dual Interface (DI) Smart Card, and Readers

TCM with secondary coupling frame (SCF)

Hybrid Metal Credit Card

Hybrid Metal Credit Card (A)

(B)

(C)

SMART CARD CONSTRUCTIONS

CROSS-REFERENCE TO RELATED APPLICATIONS

Priority (filing date benefit) is claimed from the following:
a nonprovisional of U.S. 62/258,531 filed 22 Nov. 2015
a nonprovisional of U.S. 62/371,768 filed 7 Aug. 2016
a continuation-in-part of U.S. Ser. No. 15/331,821 filed 22 Oct. 2016, which claims priority from U.S. 62/246,685 filed 27 Oct. 2015
a continuation-in-part of U.S. Ser. No. 15/072,356 filed 17 Mar. 2016, claiming priority of
U.S. 62/300,906 filed 28 Feb. 2016
U.S. 62/289,189 filed 30 Jan. 2016
U.S. 62/281,209 filed 21 Jan. 2016
a continuation-in-part of U.S. Ser. No. 14/862,119 filed 22 Sep. 2015, claiming priority of
U.S. 62/136,644 filed 23 Mar. 2015
U.S. 62/150,307 filed 21 Apr. 2015
U.S. 62/163,962 filed 19 May 2015
U.S. 62/175,308 filed 14 Jun. 2015
U.S. 62/201,578 filed 6 Aug. 2015
U.S. 62/204,466 filed 13 Aug. 2015
a continuation-in part of U.S. Ser. No. 15/197,795 filed 30 Jun. 2016, which is a continuation-in-part of U.S. Ser. No. 14/551,376 filed 24 Nov. 2014 (US 20150136858, 21 May 2015; U.S. Pat. No. 9,390,364, 12 Jul. 2016; claiming priority of:
U.S. 62/044,394 filed 1 Sep. 2014
U.S. 62/061,689 filed 8 Oct. 2014
U.S. 62/080,332 filed 16 Nov. 2014
a continuation-in-part of U.S. Ser. No. 14/619,170 filed 11 Feb. 2015, which claims benefit/priority of/from:
U.S. 62/102,103 filed 12 Jan. 2015
U.S. 62/088,598 filed 7 Dec. 2014
a continuation-in-part of U.S. Ser. No. 14/492,113 filed 22 Sep. 2014 (US 20150021403, 22 Jan. 2015), which is a continuation-in-part of U.S. Ser. No. 14/465,815 filed 21 Aug. 2014 (U.S. Pat. No. 9,475,086, 25 Oct. 2016), which claims priority of:
U.S. 62/039,562 filed 20 Aug. 2014
U.S. 62/035,430 filed 10 Aug. 2014

TECHNICAL FIELD

The disclosure may relate broadly to RFID devices including "Smartcards" or "Payment Objects" (or "payment devices") such as plastic bank cards, plastic metal hybrid cards, full metal cards, RFID enabled SIM cards (or payment cards, electronic tickets, electronic identification cards, chip cards and the like), wearable devices (activity trackers, watches, smart jewelry, wristbands, bangles, cuffs, bracelets, talisman charms, lockets, rings and the like) and accessories (payment sliders, key-fobs, money clips, wallets and the like) having RFID (radio frequency identification) chips or chip modules (CM) capable of operating in a "contactless" mode (ISO 14443 or NFC/ISO 15693), including dual interface (DI) smartcards and payment objects (or payment devices) which can also operate in "contact" mode (ISO 7816-2). Some of the disclosure(s) herein may relate to smartcards having only a contact interface.

The disclosure may relate to Antenna Modules (AM), Transponder Chip Modules (TCMs), Coupling Frames (CFs), Stacks of Coupling Frames (SCFs), including Transponders in general and Transponder Chip Modules with integrated Coupling Frame (CF), suitable for implanting, embedding, insertion or placement in smartcards, metal housings, metal casing, metal plates, jewelry pieces, tokens, tags or for mechanical and electrical connection to a loop(s) of wire or spiral of wire such as a charm bracelet for use in all payment and identification applications.

The disclosure may relate to coupling frames that are tuned to resonant at a certain ISM frequency.

The techniques disclosed herein may also be applicable to RFID devices including "non-secure smartcards and tags" such as contactless cards in the form of keycards, medic-alert tags, access control cards, security badges, key-fobs, wearables, mobile phones, tokens, small form factor tags, data carriers and the like operating in close proximity with a contactless reader.

This disclosure may also relate to the design and use of laser or chemically etched planar antennas in transponders, tags, transponder chip modules (TCMs) or antenna chip modules (AM).

This disclosure may also relate to Inductive Magnetic Coupling (IMC) or Reactive Coupling (RC) between a Transponder Chip Module (TCM) or an RFID chip connected to an antenna (e.g. in general a Tag, Transponder, Transponder Chip Module) and a Coupling Frame (CF) or a Stack of Coupling Frames (SCFs) when in the presence of an electromagnetic field generated by a contactless reader or terminal, with the antenna structure of the transponder device overlapping a slit or slits (or discontinuities) provided in the Coupling Frame (CF) or a Stack of Coupling Frames (SCFs). The Coupling Frame(s) may be made of a solid metal structure, a metal foil, or a conductive layer which is not electromagnetic transparent. The slit or a combination of slits which overlap the antenna structure of the transponder device concentrates surface eddy (Foucault) current density, to provide power delivery to the RFID chip.

This disclosure may also relate to the use of an inductive or capacitive device (inductor or capacitor) connected to a coupling frame in order to effect a controlled change in the resonant characteristics of a coupling frame.

The disclosure may also be applicable to coupling frames in card bodies, wearables, jewelry and accessories.

The disclosure may also relate to battery driven devices (active) for payment or identification applications using a coupling frame with slit(s) to concentrate surface eddy currents around the slit(s) and to induce inductance into an RLC circuit in close proximity, adjacent or overlapping thereto.

BACKGROUND

A smartcard is an example of an RFID device that has a transponder chip module (TCM) or an antenna module (AM) disposed in a card body (CB) or inlay substrate.

The antenna module (AM) or antenna chip module, which may be referred to as a transponder chip module (TCM) may generally comprise:
  a module tape (MT) or chip carrier tape (CCT), more generally, simply a support "substrate";
  an RFID chip (CM, IC) which may be a bare, unpackaged silicon die or a chip module (a die with leadframe, interposer, carrier or the like), typically disposed on a "face-down side" or "bond side" or "chip side" (or surface) of the module tape (MT);
    the RFID chip may have an antenna integrated therein, but generally a module antenna (MA) is typically required to effect contactless communication between the RFID chip and another RFID device such as an external contactless reader;

a module antenna (MA) or antenna structure (AS), typically disposed on the same face-down side of the module tape (MT) as the RFID chip (IC), and connected therewith, for implementing a contactless interface, such as ISO 14443 and NFC/ISO 15693 with a contactless reader or other RFID device.

When operating in a contactless mode, a passive antenna module (AM) or transponder chip module (TCM) may be powered by RF from an external RFID reader, and may also communicate by RF with the external RFID reader.

A dual-interface antenna module (AM) or transponder chip module (TCM) may also have a contact pad array (CPA), typically comprising 6 or 8 contact pads (CP, or "ISO pads") disposed on a "face-up side" or "contact side" (or surface) of the module tape (MT), for interfacing with a contact reader in a contact mode (ISO 7816). A connection bridge (CBR) may be disposed on the face-up side of the tape for effecting a connection between two components such as the module antenna and the RFID chip on the other face-down side of the module tape.

A conventional antenna module (AM) or transponder chip module (TCM) may be generally rectangular, having four sides, and measuring approximately 8.4 mm×11.0 mm for a 6-contact module and 11.8 mm×13.0 mm for an 8-contact module. As disclosed herein, generally a rectangular transponder chip module (TCM) may have a larger or smaller form factor than a conventional transponder chip module (TCM). Alternatively, the transponder chip module (TCM) may be round, elliptical, or other non-rectangular shape.

A module antenna (MA) may be disposed on the module tape (MT) for implementing a contactless interface, such as ISO 14443 and NFC/ISO 15693. Contact pads (CP) may be disposed on the module tape (MT) for implementing a contact interface, such as ISO 7816. The module antenna (MA) may be wire-wound, or etched, for example:

The module antenna (MA) may comprise several turns of wire, such as 50 μm diameter insulated wire. Reference may be made to U.S. Pat. No. 6,378,774 (2002, Toppan), for example FIGS. 12A, B thereof.

The module antenna (MA) may be a chemically-etched planar antenna (PA) structure. Reference may be made to U.S. Pat. No. 8,100,337 (2012, SPS), for example FIG. 3 thereof.

The module antenna (MA) may comprise a laser-etched planar antenna (PA) structure (LES). Reference may be made to U.S. Pat. No. 9,272,370.

A planar antenna (PA) structure, or simply "planar antenna (PA)", whether chemically-etched (CES) or laser-etched (LES) is a type of antenna structure (AS) and may comprise a long conductive trace or track having two ends, in the form of a planar, rectangular spiral, disposed in an outer area of a module tape (MT), surrounding the RFID chip on the face-down side of the module tape. This will result in a number of traces or tracks (actually, one long spiraling trace or track), separated by spaces (actually, one long spiraling space). The track (or trace) width may be approximately 100 μm. The planar antenna may be fabricated on other than the module tape, such as on a separate substrate, and joined to the module tape.

A module antenna (MA) connected to an RFID chip (CM), typically on a substrate or module tape (MT), may be referred to as a "transponder chip module", or simply as a "transponder", or as a "module". Reference may be made to U.S. Pat. No. 9,390,364 (Finn et al., 2016 Jul. 12), U.S. Pat. No. 9,475,086 (Finn, et al., 2016 Oct. 25) and US 20150021403 (Finn et al., 2015 Jan. 22) for examples of transponder chip modules (and coupling frames).

SOME PATENT REFERENCES

U.S. Pat. No. 8,608,082 (2013 Dec. 17 Oberthur Technologies) discloses an electronic device (10) comprising a microcircuit (18) module (20), a near-field communication antenna (36) electrically connected to the microcircuit (18) of the module (20), delimiting an antenna surface (S), and a body (12) incorporating the module (20). More precisely, the antenna (36) is arranged within the module (20) and the body (12) incorporates means (40) of amplifying the gain of the antenna (36) comprising an electrically conductive element (42) electrically isolated from the microcircuit (18) and the antenna (36), of an annular general shape arranged around an area (R) of the body (12) forming a volume generated by the projection of the antenna surface (S) along a direction (Z) substantially orthogonal to the surface (S).

Distinguishing Features Over U.S. Pat. No. 8,608,082 (2013 Dec. 17 Oberthur Technologies)

Oberthur is silent in mentioning multiple coupling frames (gain amplification elements) within the same device, and do not specify an optimum spatial overlap which is defined by dimensions of one or more module openings/slits. Usually this is defined by the "interlayer" which features a cavity with optimum overlap for the given antenna design. It can be said that the gain from the other metal layers is non-consequential or reduced relative the "interlayer" as the slits and openings in these layers serve to prevent shielding and have non-optimum proximity and overlap with the module antenna.

In S66 CIP2 (a non-provisional of U.S. 62/371,768 filed 7 Aug. Nov. 2016)

FIG. 16B—discloses use of magnetic shielding layer. Module opening is distinct from coupling frame layer, different size and no slit.

FIG. 17—discloses key fob design. Different opening sizes in front and rear metal layers, optimum antenna overlap achieved by middle interlayer.

FIG. 20A—module opening is smaller than module, designed with cavity to overlap antenna and accommodate mold mass of chip, not the entire module. Module cavity is actually in the plastic core and front layers.

In U.S. 62/258,531 filed 22 Nov. 2015 . . .

FIG. 10—discloses ceramic metal hybrid card with metal interlayer. Module is accommodated in ceramic layer and sits on top of the metal interlayer. Opening in interlayer with overlap optimized to antenna shape and to accommodate protruding mold mass of chip.

FIG. 11—ceramic metal hybrid card with two coupling frames. Coupling efficiency of lower CF "Metal layer 2" is greatest as this has optimum opening size and overlap with transponder. The fact that it sits are below the antenna and not co-planar with antenna as upper CF "Metal layer 1" means this CF drives the performance of the device.

SUMMARY

It is a general object of the invention to provide techniques for incorporating a transponder chip module (TCM), particularly a passive transponder chip module, in an RFID device such as (but not limited to) a smart card.

It is a further object of the invention to provide improved coupling of smartcards (as an example of secure documents, RFID devices and the like, including dual-interface smartcards and metal or metallized smartcards) with a contactless reader.

As used herein, a transponder chip module (TCM) may generally comprise an RFID chip and a module antenna disposed on one (face-down) side of a module tape, and contact pads on an opposite (face-up) side of the module tape. In the main, hereinafter, discussions may be directed to passive transponder chip modules operating primarily or exclusively in a contactless mode (e.g., ISO 14443, 15693). However, the techniques disclosed herein may be applicable to dual-interface transponder chip modules capable of operating in both contactless and contact modes (e.g., ISO 7816).

According to the invention, generally, RFID devices comprising (i) a transponder chip module (TCM) having an RFID chip (IC) and a module antenna (MA), and (ii) a coupling frame (CF) having a slit (S). The coupling frame may be disposed closely adjacent the transponder chip module so that the slit overlaps the module antenna. The RFID device may be a payment object such as a jewelry item having a metal component modified with a slit (S) to function as a coupling frame. The coupling frame may be moved (such as rotated) to selectively position the slit to selectively overlap the module antennas (MA) of one or more transponder chip modules disposed in the payment object, thereby selectively enabling contactless communication between a given transponder chip module in the payment object and another RFID device such as an external contactless reader.

Coupling frames (CF) in combination with transponder chip modules (TCMs) may provide for inductive magnetic coupling with a contactless reader or point of sale terminal, or another RFID device. Coupling frames (CF) in combination with transponder chip modules (TCMs) may enhance (including enable) contactless communication between As used herein, a "coupling frame" (CF) may comprise a metal layer, metal frame, metal plate or any electrically-conductive medium or surface with an electrical discontinuity such as in the form of a slit (S) or a non-conductive stripe extending from an outer edge thereof to an inner position thereof, the coupling frame capable of being oriented so that the slit (S) overlaps (crosses-over) the module antenna (MA), such as on at least one side thereof. The slit may be straight, and may have a width and a length. In some embodiments, the slit may extend to an opening (MO) for accepting the transponder chip module. In other embodiments, there may only be a slit, and no opening for the transponder chip module. The coupling frame (CF) may also comprise a conductive path or a track of wire formed around the transponder chip module (TCM), such as by embedding wire. The coupling frame may be planar or three dimensional (such as a curved surface). The coupling frame for inductive magnetic coupling with a reader may couple with either a passive or an active transponder chip module.

The overlap of the slit with the module antenna may be less than 100%. In addition, the width and length of the slit can significantly affect the resonance frequency of the system and may be used as a tuning mechanism. As the width of slit changes, there is a resulting change in the overlap of the slit with the antenna.

In use, the coupling frame may be disposed in close proximity to a transponder chip module, such as atop the module, so that the slit (or other discontinuity) overlaps at least a portion of the module antenna of the transponder chip module, so that the coupling frame enhances (including enables) coupling between the transponder chip module and another RFID device such as a contactless reader. When the slit is not overlapping the antenna, communication with the transponder chip module may be suppressed (or inhibited, including disabled). The coupling frame may be incorporated into an RFID device such as a smart card, it may constitute substantially the entire body of a metal smart card,
it may be incorporated into the transponder chip module, and it may comprise a component of a payment object.

In order to satisfy communication requirements for a given smartcard application, in terms of maximum communication read/write range for example, the chip (IC) must have a minimum power level delivered to it. The module antenna (MA) inductance, resistance and capacitance all affect the power level delivered to the chip (IC); at the maximum communication distance from the reader antenna, the module antenna (MA) is delivering the minimum chip (IC) power level. The better the performance of a given module antenna (MA) with a given chip (IC), the greater the maximum communication distance of the transponder chip module (TCM) with respect to the reader antenna.

This disclosure also relates to passive RFID devices operating on the principle of inductive magnetic coupling to effectuate data communication and harvest energy with and from a contactless reader and to drive active elements, in particular for integration into payment and identification objects.

It is a further object of the invention to provide improved coupling frames (CF), improved performance of coupling frames (CF), and improved techniques for tuning coupling frames (CF) using capacitors.

In order to satisfy close inductive coupling through the concentration of surface eddy currents between a module antenna (MA) of a transponder chip module (TCM) overlapping the slit (S) of a coupling frame (CF), the resonance frequency of the two RLC circuits, module antenna (MA) and coupling frame (CF), should be matched to achieve optimum activation distance of the transponder. Therefore, the inductance, resistance and capacitance of the coupling frame (CF) may need to be adapted for proper tuning and to achieve the correct power delivery to the chip.

The width and length of the slit (S) may play a role in the tuning, as may the position connection of a capacitive device across the slit (S). The device connection across the slit (S) can be made directly or indirect via the transponder chip module (TCM).

In their various embodiments, the invention(s) described herein may relate to industrial and commercial industries, such RFID applications, payment smartcards, electronic passports, identity cards, access control cards, payment objects, wearable devices, smart jewelry and the like.

Other objects, features and advantages of the invention(s) disclosed herein, and their various embodiments, may become apparent in light of the descriptions of some exemplary embodiments that follows.

BRIEF DESCRIPTION OF THE DRAWINGS

Reference will be made in detail to embodiments of the disclosure, non-limiting examples of which may be illustrated in the accompanying drawing figures (FIGs). Some figures may be in the form of diagrams. Some elements in the figures may be exaggerated, others may be omitted, for illustrative clarity.

Any text (legends, notes, reference numerals and the like) appearing on the drawings are incorporated by reference herein.

Some elements may be referred to with letters ("AM", "BA", "CB", "CCM", "CM", "MA", "MT", "PA", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and variations thereof, and may be collectively (all of them at once) or individually (one at a time) referred to simply by the numeral ("310").

The figures presented herein may show different embodiments of RFID devices, such as smart cards or payment objects such as wearable devices. Some of the drawings may omit components such as the transponder chip module or module antenna, for illustrative clarity. Some of the figures may show only components of an RFID device, such as coupling frames.

Figure 1:
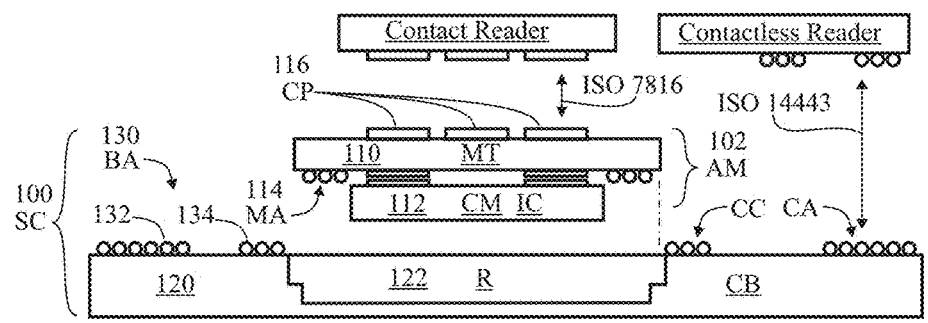

FIG. 1 is a diagram (cross-sectional view) of a dual-interface smart card (SC) and readers.

Figure 2A:
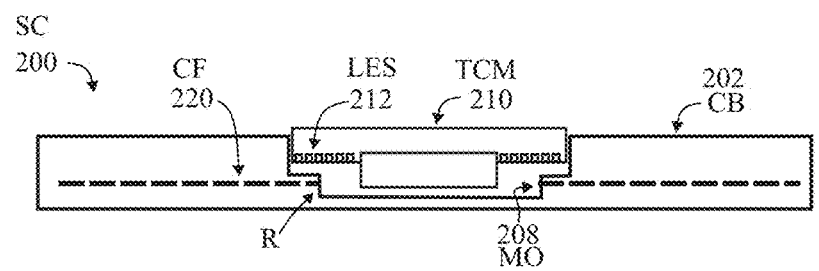

FIG. 2A is a diagram (cross-sectional view) illustrating a coupling frame in a card body of a smart card.

Figure 2B:
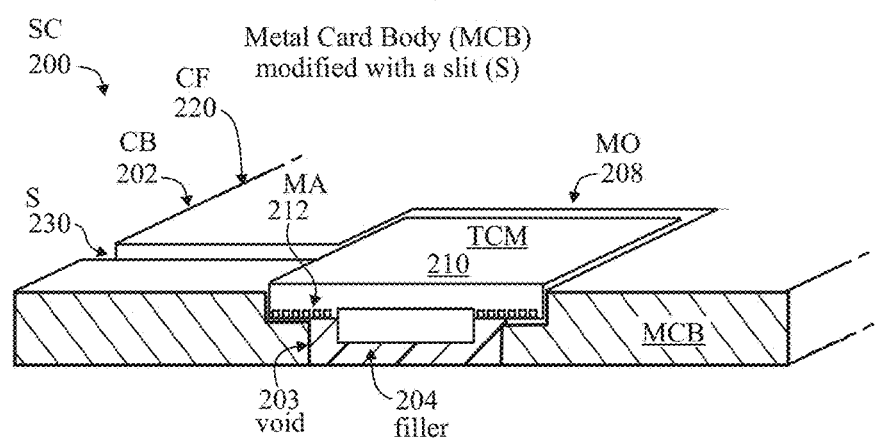

FIG. 2B is a diagram (partial perspective view) illustrating smart card having a metal card body modified to function as a coupling frame.

Figure 2C:
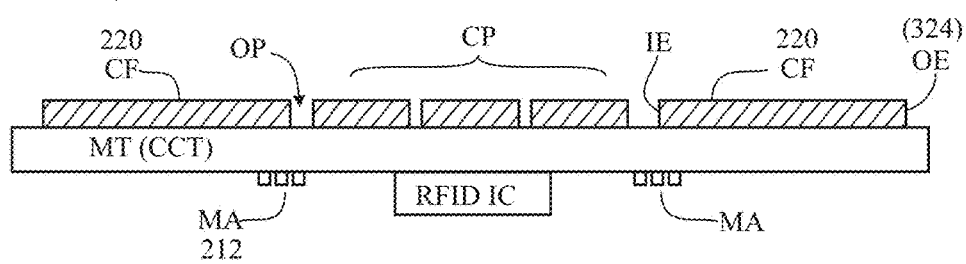

FIG. 2C is a diagram (cross-sectional view) illustrating a coupling frame integrated into a collective coupling enhanced (CCE) transponder chip module (TCM).

Figure 2D:
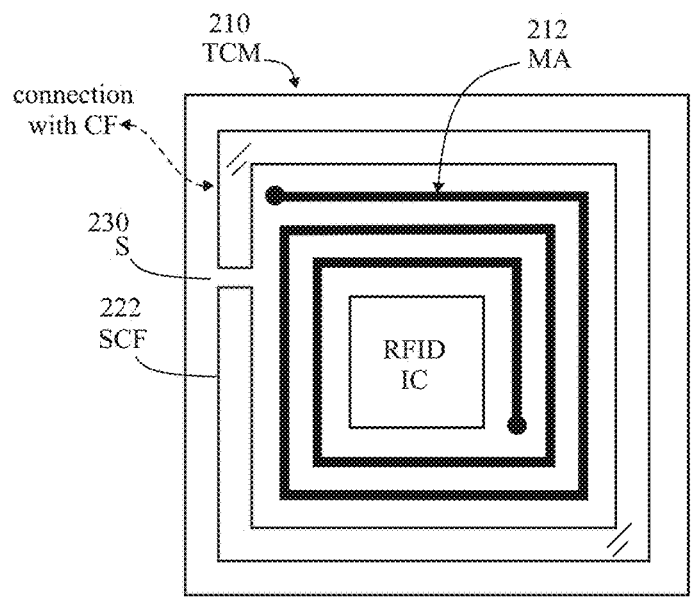

FIG. 2D is a diagram showing a transponder chip module (TCM) having a secondary coupling frame (SCF) and connecting with an external coupling frame (CF, not shown).

Figure 3A:
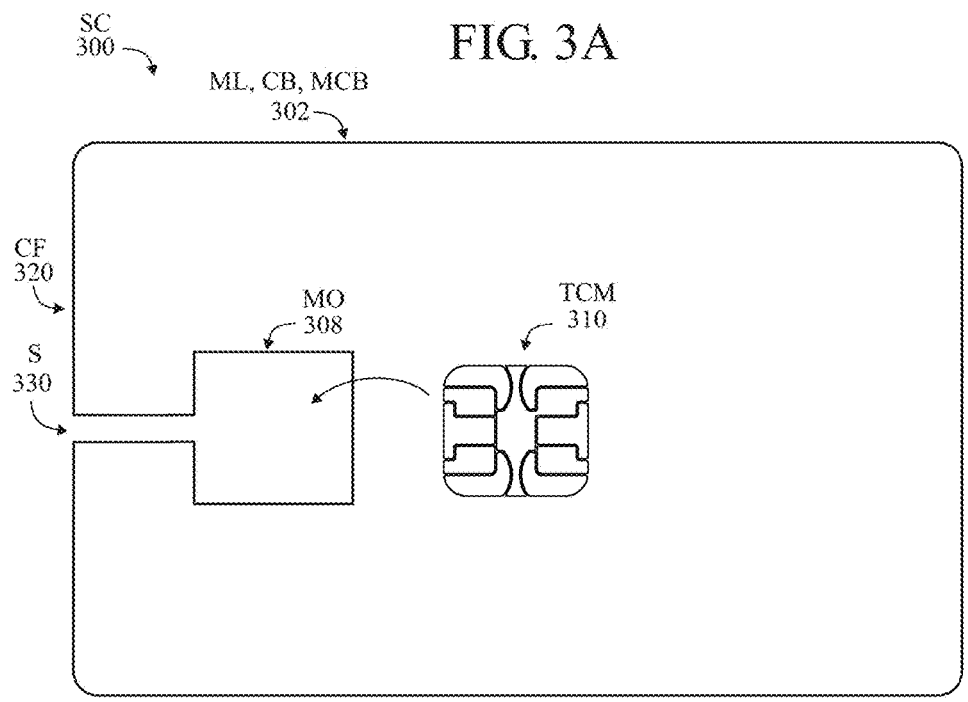

FIG. 3A is a diagrammatic view of a front surface of a smart card (SC) which may be a metal card or composite metal card having a slit(S) to function as a coupling frame (CF).

Figure 3B:
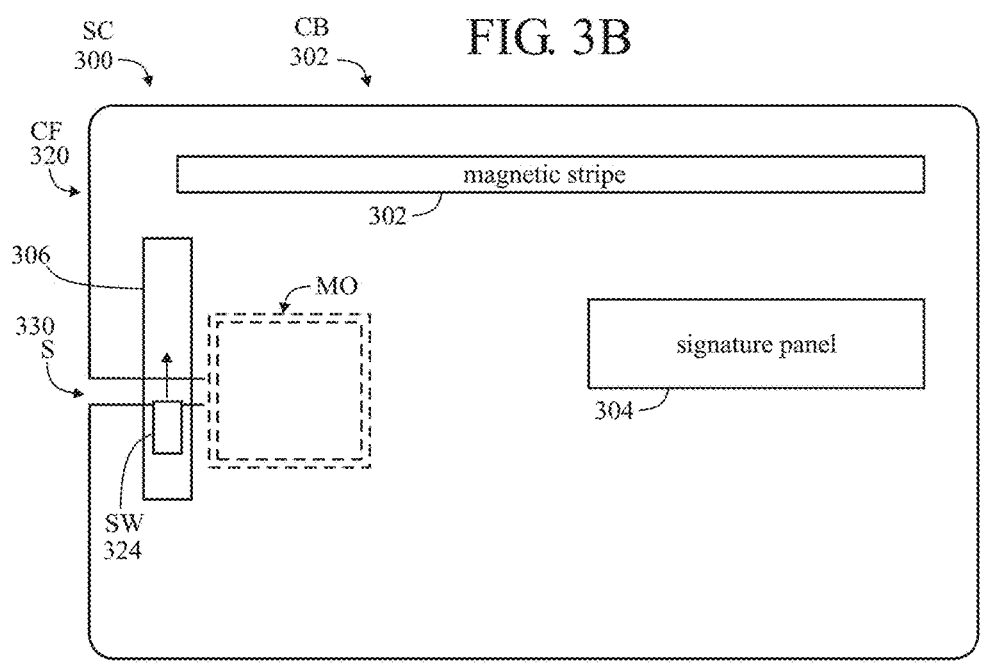

FIG. 3B is a plan view of the back side of the smart card shown in FIG. 3A, showing incorporating a switch to short out the slit (S) in the card body (CB).

Figure 3C:
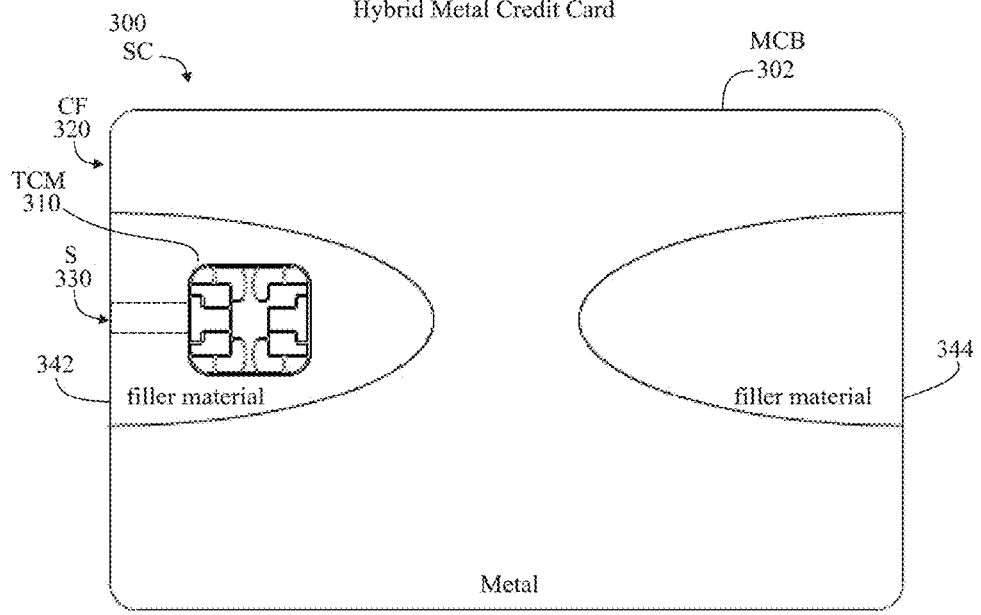

FIG. 3C is a plan view of a hybrid metal smart card, which may be a credit card.

Figure 3D:
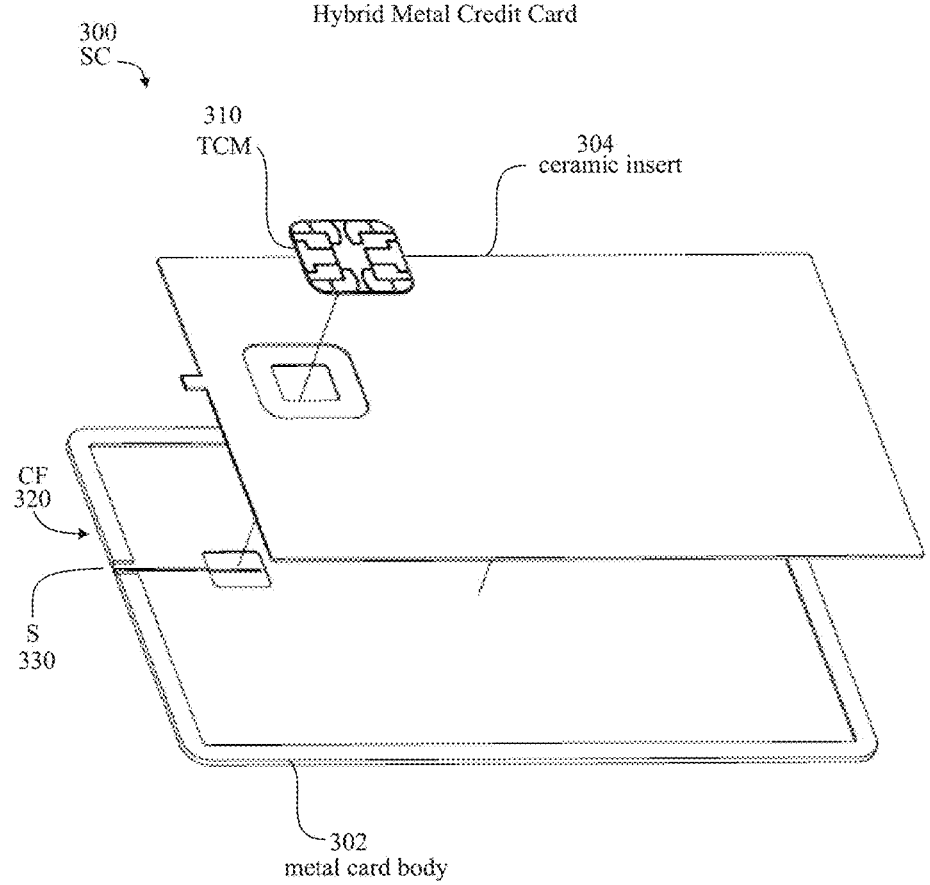

FIG. 3D is a perspective view (exploded) of a hybrid ceramic and metal smart card.

Figure 4A:
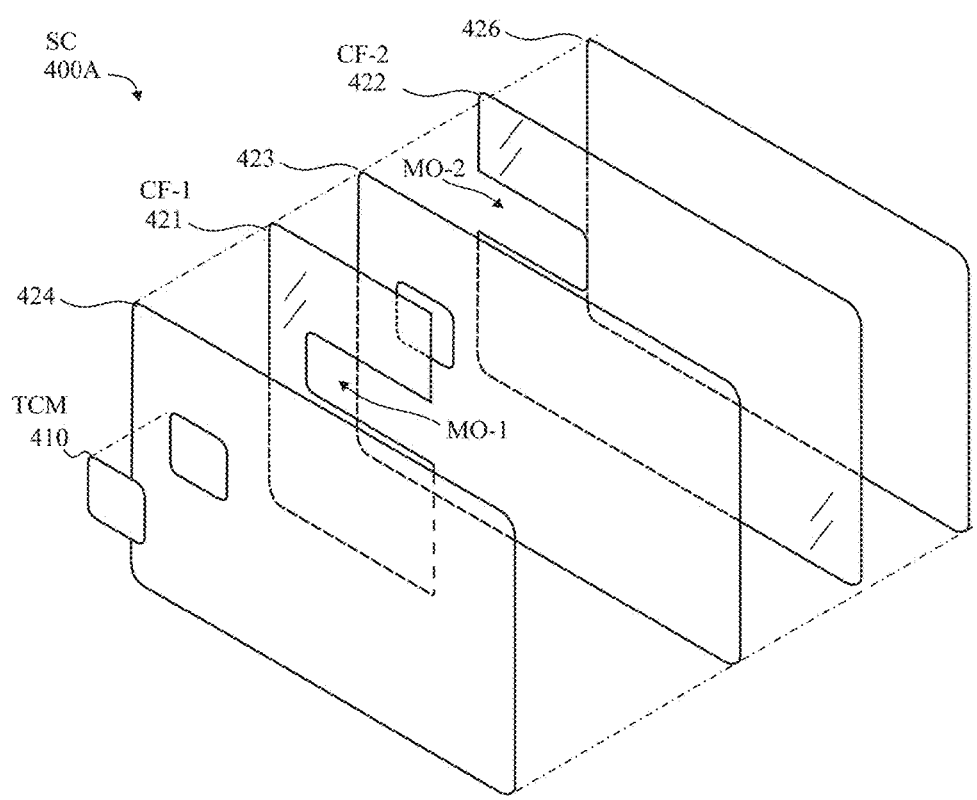

FIG. 4A is an exploded view of a smartcard (SC) having two coupling frames (CF) on two different layers.

Figure 5:
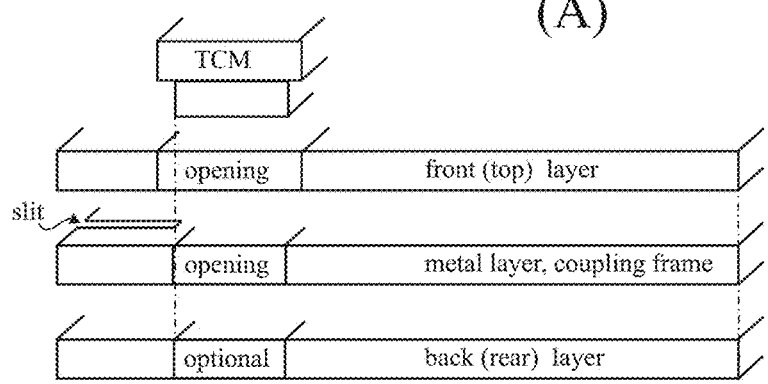
Figure 5:
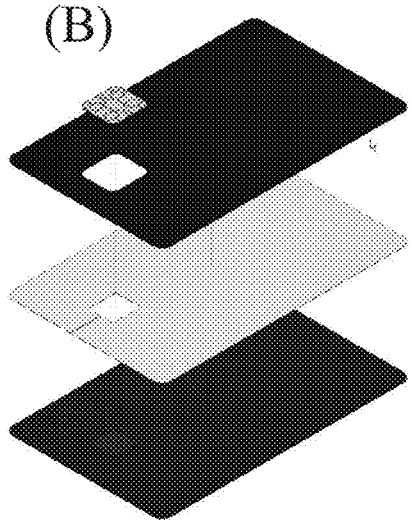
Figure 5:
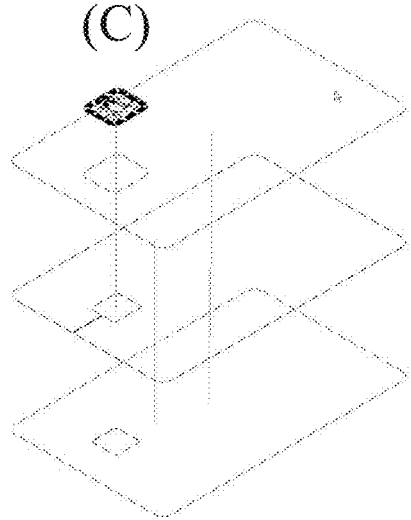

FIG. 5 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

Figure 6:
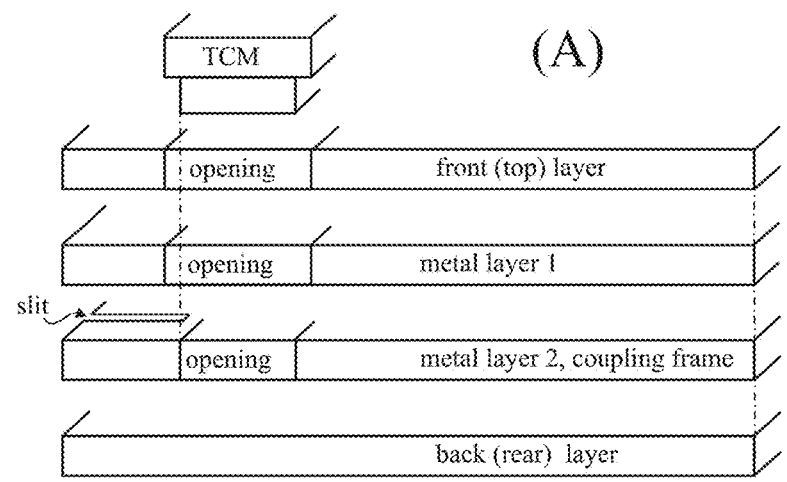
Figure 6:
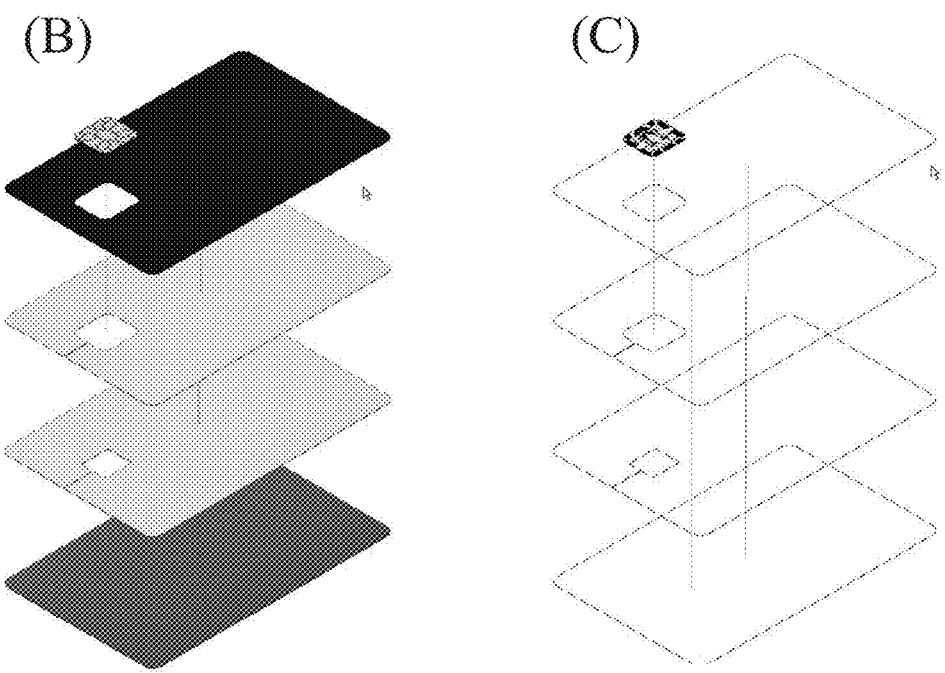

FIG. 6 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

Figure 7:
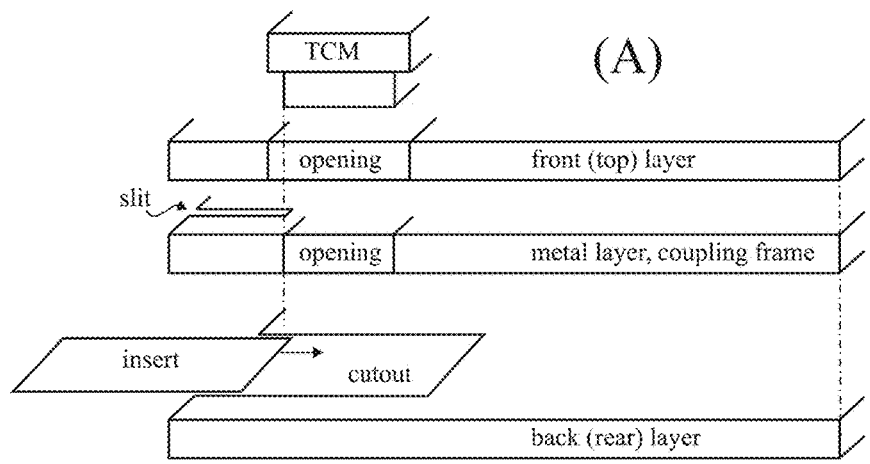
Figure 7:
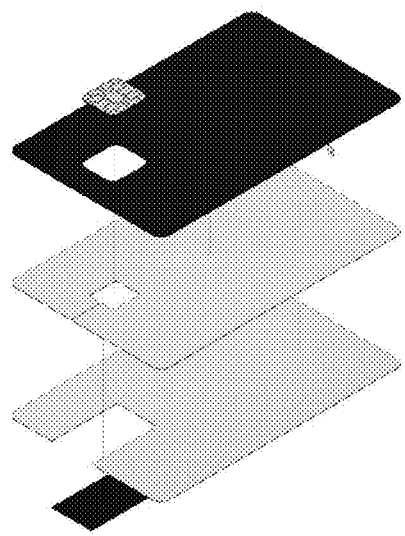
Figure 7:
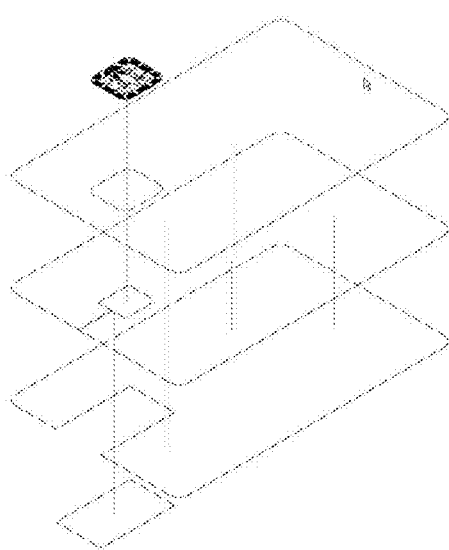

FIG. 7 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

FIG. 1 is a diagram (cross-sectional view) of a conventional dual-interface smart card (SC) and readers, as exemplary of an RFID device. This RFID device is "dual interface" since it can interact either with external contact readers (e.g., ISO 7816) or with contactless readers (e.g., ISO 14443, 15693).

FIG. 1 illustrates a smart card SC (100) in cross-section, along with a contact reader (e.g., ISO 7816) and a contactless reader (e.g., ISO 14443). An antenna module (AM, or transponder chip module TCM) 102 may comprise a module tape (MT) 110, an RFID chip (CM or IC) 112 disposed on one side (face-down) of the module tape MT along with a module antenna (MA) 114 for interfacing with the contactless reader. The antenna module (AM) may comprise contact pads (CP) 116 disposed on the other (face-up) side of the module tape (MT) for interfacing with the contact reader. The card body (CB) 120 comprises a substrate which may have a recess (R) 122 extending into one side thereof for receiving the antenna module (AM). (The recess R may be stepped—such as wider at the surface of the card body (CB)—to accommodate the profile of the antenna module AM.) The booster antenna (BA) 130 may comprise turns (or traces) of wire (or other conductor) embedded in (or disposed on) the card body CB, and may comprise a number of components such as (i) a card antenna (CA) component 132 and (ii) a coupler coil (CC) component 134. It may be noted that, as a result of the recess R being stepped, a portion of the card body (CB) may extend under a portion of the antenna module (AM), more particularly under the module antenna (MA).

In the main, hereinafter, RFID devices having only a contactless interface (and not having a contact interface) may be described. In the main, hereinafter, RFID devices having a coupling frame rather than a booster antenna may be described.

Some Definitions

As used herein, a transponder chip module TCM, which may be referred to simply as a "transponder", is typically a component of an RFID device such as a smartcard, or a payment object and may comprise (i) a support substrate or module tape MT, (ii) an RFID chip (IC, CM) and (iii) a module antenna (MA), connected with the RFID chip. The transponder chip module may be referred to in some descriptions simply as the "module" or as the "transponder". It may also sometimes be referred to as an antenna module (AM) or antenna chip module A transponder chip module may be capable of communicating at least contactlessly (e.g., ISO 14443, 15693) with another RFID device such as an external contactless reader (such as at a point of sale terminal). The RFID chip in the transponder may also support a contact interface (e.g., ISO 7816), resulting in a dual-interface module. Typically, the payment objects disclosed herein may operate purely in a contactless mode.

A transponder may be a "passive" transponder which does not have its own power source (e.g., battery), but rather which receives (harvests) its operating power from an external reader (interrogator) rather than, for example, from a battery. An "active transponder" may have its own internal power source, such as a battery. A battery-assisted passive device may have a small battery on board and is activated when in the presence of an RFID reader.

The module antenna (MA) may be planar antenna structure comprising a single long conductive track having two ends connected with corresponding two terminals of the RFID chip. The module antenna may be laid out in a spiral pattern comprising several (such as 10-15) "traces" (sometimes referred to as "tracks"), separated by spaces (sometimes referred to as "gaps"). The module antenna may be formed by etching (either chemical etching or laser etching) of a conductive layer on the module tape (or a conductive foil applied to the module tape). The track (or trace) width may be approximately 100 µm, and may vary from end-to-end. The gap width may be approximately 25 µm and may vary along the length of the module antenna. The overall length of the module antenna may be approximately 400 mm. The traces of the module antenna may sometimes be referred to as windings since the module antenna MA (or antenna structure AS) is analogous to a wire-wound antenna. The techniques disclosed herein may also be applicable to module antennas which are wire-wound or formed by embedding wire, having a number of turns and two ends.

The module antenna may be disposed as a single long conductive track which may be in the form of a rectangular spiral disposed in a generally rectangular path or band around a peripheral annular area of the module tape. An annulus is a plane figure consisting of the area between a pair of concentric circles—i.e., the area inside the outer circle and outside the inner circle). A square annulus is the planar shape contained between two concentric axis-parallel squares, i.e., two squares with a common center whose sides are parallel to the x- and y-axes. The annular area occupied by the module antenna may be rectangular, or other than rectangular, such as square or circular. In the examples described herein, the module antenna typically resides in a generally square rectangular annular area, and the module antenna may be considered to have four "sides".

The module antenna (or simply "antenna", or "planar antenna", or "antenna structure", or "laser-etched antenna structure") may be disposed on the same face-down side of the module tape as the RFID chip. The RFID chip may be disposed in a central area of the module tape which is devoid of antenna traces, and which may be referred to as "no man's land". The RFID chip may be disposed on an opposite side of the module tape from the module antenna. Additional antenna structures such as a second module antenna or capacitive stubs may be connected with the module antenna. See U.S. Pat. No. 8,474,726. In no-man's land, a metal foil or layer (or cladding), on either side of the module tape may be segmented, as disclosed for example in US 2015/0269474 (U.S. Ser. No. 14/619,177 filed 11 Feb. 2015).

The traces on a given side of the module antenna may be modified so that the turns thereof extend inward into the no-mans land, typically to relocate an outer end of the module antenna closer to the RFID chip for connecting (such as by wire bonding) thereto. This may result in one side of the module antenna being U-shaped. See US 2015/0269474 (U.S. Ser. No. 14/619,177) filed 11 Feb. 2015. See WO 2014016332 (2014 Jan. 30, Linxens Holding).

Magnetic materials may be used to increase the effective size of an RFID antenna and the concentration of magnetic flux. As used herein, "magnetic particles" may refer to particles that are conductive, having a resistance of hundreds of ohms, in contrast with ferrite particles. The materials may be performed by sintering or high pressure lamination (with or without an additional binder) into a size approximately matching the internal area of the antenna. The magnetic material may comprise ferrites or conductive non-ferrites (having a resistance of hundreds of ohms) The magnetic material may in the form of flakes of the order of a hundred microns in lateral size and a few microns in thickness. The magnetic material, once formed into a suitable shape, may be deposited or placed in the plane of the antenna or adjacent to the antenna. In addition, such magnetic material may be used in conjunction with a coupling frame whereby the magnetic is placed over some or all of the coupling frame in order to redirect magnetic flux lines and improve the performance of the TCM.

Coupling Frames

According to some embodiments of the invention, the booster antenna in an RFID device may be eliminated, or replaced by a "coupling frame" (CF). Generally, the overall function of both a booster antenna and a coupling frame are to enhance (improve) coupling and communication between a transponder chip module (TCM) and an external contactless reader (or with another RFID device).

As used herein, a coupling frame (CF) may generally comprise a conductive, planar surface or element (such as a conductive layer, or a conductive foil) having an outer edge, and discontinuity such as a slit (S) or a non-conductive stripe extending from the outer edge of the conductive surface to an interior position thereof. The coupling frame may be a curved surface, rather than being planar.

Most of the coupling frames described herein may have a "continuous" surface, and may comprise a foil or sheet or layer of metal having a slit (an electrical discontinuity) for overlapping a module antenna and, in some cases having an appropriate opening (MO) for accommodating mounting the transponder chip module. Coupling frames may be printed, and may be made up of a wire grid or array (such as wire embedding wire (copper or silver) and making a physical connection through overlapping wires to create a coupling frame. The coupling frame could also be a metal mesh. Coupling frames made of mesh or wire are exemplary of "discontinuous" surface coupling frames. Reference may be made to FIG. 6A of US 20150136858 which shows a smartcard (SC) having a coupling frame (CF) formed by embedding wire. In either case (continuous surface or discontinuous surface), the coupling frame comprises a "surface" or a "conductive surface", and a slit. The slit may be referred to as a slot or a gap.

When referring to the overall coupling frame as being "continuous", it should be understood that the slit (S) represents a mechanical and electrical discontinuity. A "discontinuous" coupling frame could be made from a mesh, or from embedding wire in a suitable pattern in a substrate, both of which would be arranged to exhibit a slit/discontinuity.

In use, a coupling frame may be disposed closely adjacent to (in close proximity, or juxtaposed with) a transponder chip module (TCM) having a module antenna (MA) so that the slit (S) overlaps (traverses, over or under) at least a portion of the module antenna. For example, the slit (S) may extend from a position external to the module antenna, crossing over (or overlapping) at least some of the traces of the module antenna, such as extending over all of the traces on one side of the module antenna and may further extend into the interior area (no-man's land) of the module antenna.

In use, the coupling frame CF may be positioned so that the slit S overlaps or traverses at least some of the traces of the module antenna MA on at least one side thereof. The slit S may extend at least partially, including completely across only one side of the module antenna, and may extend further across a central area ("no-mans land") of the module antenna (devoid of traces) to the opposite side of the module antenna. The coupling frame and the module antenna may both be substantially planar, positioned very close together, parallel with one another, and separated by an air gap or dielectric layer which may be no greater than 100 μm, 50 μm or 20 μm. Generally, the closer the coupling frame is to the module antenna (smaller separation), the better the communication (such as read/write performance) with the external contactless reader will be. With increasing separation distance, the read/write performance may degrade.

The coupling frame may enhance communication (signal, power) between an external contactless reader and the transponder chip module when the slit is positioned across (to traverse) the traces of the module antenna on at least one side thereof.

Transponder chip modules are conventionally incorporated into RFID devices which are smart cards (including plastic smartcard, metal smartcard, hybrid smartcard). A coupling frame can be incorporated into the smart card. Refer to U.S. Pat. No. 9,475,086 and US 20150021403. A coupling frame may be incorporated into the transponder chip module itself. Refer to US 20150136858. As disclosed herein, transponder chip modules may be incorporated into other RFID devices, such as payment objects comprising wearable devices, smart jewelry and payment accessories.

A coupling frame may be incorporated in metal payment devices to enable contactless communication. A coupling frame may be incorporated in any RFID device having multiple transponder chip modules to selectively enable communication with a given one of the transponder chip modules. Multiple coupling frames may be incorporated into a given RFID device. A coupling frame may substitute (eliminate the need) for a booster antenna in an RFID device.

Incorporating Coupling Frames into RFID devices

According to the invention, generally, a transponder chip module (with or without its own coupling frame) can be incorporated into an RFID device such as a smartcard or a payment object. The device may constitute a passive transponder.

A smartcard may comprise a metal layer which is modified (typically with a slit appropriately located vis-à-vis the module antenna) to function as a coupling frame.

An entire metal card body of a metal smart card may be provided with a slit (S, or other discontinuity) to function as a coupling frame.

a metal layer of a hybrid smartcard (having dielectric layer and metal layer) may be provided with a slit (S, or other discontinuity) to function as a coupling frame.

A payment object may comprise a "wearable" device embodied in a jewelry item, bangle, bracelet or the like having a metal component modified (typically with a slit appropriately located vis-à-vis the module antenna) to function as a coupling frame A card body can be made from aluminum and directly coloured by anodizing procedures. Jewelry items may be manufactured to have a rustic appearance that wears (or acquires a patina) during use such that the appearance of the product improves over time.

Metal jewelry items having transponders incorporated therein may operate as payment objects. To insert a transponder into a metal casing or a metal charm, the metal would normally operate like a faraday cage with all electromagnetic transmission, and reception would be impaired. As disclosed herein, by providing a slit or slot (or an insulating strip or stripe) in a metal component of the metal charm so that the component may function as a coupling frame. A transponder device (with or without its own coupling frame integrated therein) may be located, embedded or inserted into the metal charm and can couple with the metal charm which in turn couples with the external contactless reader generating the electromagnetic field.

By incorporating a coupling frame into the device, contactless communication between the RFID chip of the transponder chip module and an external RFID reader or another RFID device may be enhanced or enabled.

The slit (S) in a coupling frame may be linear (straight), and may have a width of approximately 1-2 mm and a length of approximately 8-13 mm, but may have other dimensions and form factors. The slit (S) may be arranged to overlap (traverse) the traces of the module antenna at 90° thereto, or at another angle. The slit (S) may be other than straight.

It should be understood that the coupling frame may be on a different plane than the module antenna. The slit of the coupling frame may overlap or traverse at least some outer turns (or traces) of the module antenna on one side thereof, including overlapping all of the turns of the module antenna on the one side thereof and extending into (above) the inner area (no-mans land) of the module antenna. The slit may be long enough to overlap one or more turns of the module antenna on an opposite side of the module antenna. The slit may be wide enough to overlap one or more inner turns of the module antenna on one or both adjacent side(s) of the module antenna.

A transponder chip module (with or without its own coupling frame) can be incorporated into an RFID device which may be a smartcard or other payment object.

A coupling frame may be movable so as to selectively enable (enhance) or disable (suppress) communication with a transponder chip module incorporated into the RFID device. A coupling frame may be associated with two or more transponder chip modules in a single RFID device, and may be movable to selectively enable one or the other of, or neither one of the transponder chip modules.

Smart Card with Coupling Frame

U.S. Pat. No. 9,475,086 discloses a conductive coupling frame (CF) having two ends, forming an open loop, disposed surrounding and closely adjacent a transponder chip module (TCM), and substantially coplanar with an antenna structure (AS, LES) in the transponder chip module (TCM). A metal card body (MCB) having a slit (S) extending from a module opening (MO) to a periphery of the card body to function as a coupling frame (CF). The coupling frame (CF) may be thick enough to be non-transparent to RF at frequencies of interest. A switch may be provided to connect ends of the coupling frame (CF) across the slit (S). The transponder chip module (TCM) may comprise a module antenna (MA) which may be a laser-etched antenna structure (LES) and a non-perforated contact pad (CP) arrangement.

FIG. 2A shows an example of a smart card 200 with a coupling frame (CF) 220 incorporated into its card body (CB) 202 which has a stepped recess (R). A transponder chip module (TCM) 210 has a planar antenna (PA) which may be a laser-etched antenna structure (LES) 212. The coupling frame (CF) has an opening (MO) 208 for receiving the transponder chip module (TCM). The coupling frame (CF) may have a slit (not visible) extending from the opening (MO) to an outer edge of the coupling frame (CF). The dashed line indicates, schematically, that the coupling frame may comprise a metal layer in a stackup of a card body. An inner edge of the coupling frame (CF) may overlap (or underlie) at least some outer turns of the module antenna (MA), which may be a planar antenna (PA) which is laser-etched antenna structure (LES) in the transponder chip module (TCM). Viewed from another perspective, an outer portion of the module antenna (MA may overhang an inner portion of the coupling frame (CF). The coupling frame (CF) may enhance communication between the transponder chip module and another RFID device such as a contactless reader. The transponder chip module may be dual-interface, supporting both contactless and contact communication with external readers.

FIG. 2B illustrates a transponder chip module (TCM) 210 disposed in the card body (CB) 202 of a metal smartcard (SC) 200, or metal card (MC), wherein substantially the entire card body (e.g., 760 µm thick) comprises metal, and may be referred to as a metal card body (MCB). The transponder chip module (TCM) may reside in an opening (MO) 208 extending completely through the card body, The opening may be stepped, having a larger area portion and smaller area portion, as shown. This may result in a void 203 behind the transponder chip module (TCM), and the void may be filled with non-conductive filler 204. In a conventional metal smart card (not having a slit to function as a coupling frame), the void behind the transponder chip module may allow electromagnetic radiation from an external reader to interact with the transponder chip module.

A slit (S) 230 extends from an outer edge of the metal card body (MCB) to the opening (MO) and may overlap (underneath, as viewed) an outer portion of the module antenna (MA) 212 which may be a laser-etched antenna structure (LES). Similarly, a slit may be provided through a metal layer of a hybrid smart card. The slit (S) modifies the metal card body (MCB) or layer, allowing it to operate as a coupling frame 220 to enhance contactless communication with the transponder chip module.

FIG. 2B is illustrative of a coupling frame 220 substantially surrounding a transponder chip module and having an opening to accommodate the transponder chip module.

Although a module opening for the transponder chip module may be shown in the illustrations of this and some other embodiments, it should be understood that many of the techniques described herein may be applicable to coupling frames having a slit, without a module opening. Such coupling frames may not be strictly coplanar with the transponder chip module, but they may be disposed closely adjacent and parallel thereto.

Metal payment objects such as metal smart cards may feature a cavity to accommodate the transponder chip module TCM. The cavity may not completely penetrate the payment object, or it may be covered from one face by a continuous metal. The transponder chip module may be shielded from the continuous metal layer by magnetic shielding material. This allows the cavity to be concealed. In addition the slit may be concealed by jewels or crystals.

The magnetic shielding may be in the form of a pre-laminated composite material made of beads or flakes of a magnetic material, e.g. iron-based alloy such as Sendust (a ferrite material) within a polymer matrix. Alternatively a sintered block of magnetic material may be used. Any composition of magnetic shielding material may be used so as to reduce (including prevent) attenuation of electromagnetic signal strength and/or compensate for resonance frequency shifts resulting from the metal cavity cover or cavity body.

As discussed in U.S. Pat. No. 9,475,086, a coupling frame CF is typically a planar element having a opening or cavity in its body, and a slit (or other electrical discontinuity) extending from the opening to a periphery (edge) of the coupling frame CF. The slit makes the coupling frame "open loop". Typically, the coupling frame CF is disposed closely adjacent to a transponder chip module TCM so that the slit S of the coupling frame CF extends generally perpendicular to and over (overlaps) at least a portion the module antenna MA of the transponder chip module TCM. Since the coupling frame is generally coplanar with the transponder chip module, a "central" opening MO in the coupling frame may accommodate a portion of the transponder chip module, such as the mold mass thereof, which may extend into the opening.

For example, FIG. 2C thereof (compare FIG. 2A herein) shows a transponder chip module TCM disposed in the card body CB of a smartcard SC wherein the coupling frame CF overlaps (or underlies) the laser-etched antenna structure LES in the transponder chip module TCM. Compare FIG. 2A herein.

For example, FIG. 2D thereof (compare FIG. 2B herein) shows a transponder chip module TCM disposed in the card body CB of metal smartcard SC, or metal card MC, wherein substantially the entire card body CB comprises metal, and may be referred to as a metal card body MCB.

US 20150021403 22 Jan. 2015 discloses a smartcard (SC) may comprise: a metal layer (ML); and an opening (MO) in the metal layer for receiving a transponder chip module (TCM); characterized by: a discontinuity comprising a slit (S) or a non-conductive stripe (NCS), in the metal layer (ML), extending from the opening to a periphery of the metal layer, whereby the metal layer (ML) comprises an open-loop coupling frame (CF) having two ends. The coupling frame may be disposed closely adjacent to the transponder chip module when the transponder chip module is disposed in the opening. A portion of the coupling frame (CF) may overlap a portion of an antenna structure (AS) in the transponder chip module (TCM). The coupling frame may extend over substantially the entire area of the smartcard. The metal layer may comprise a metal card body (MCB) of a metal smartcard. As further disclosed therein:

The slit may extend completely through the metal layer. The slit may extend only partially through the metal layer, and remaining material of the metal layer below the slit may have a thickness below a transparency threshold for the metal layer. The slit may have a width which is smaller than the opening. The slit may be at least partially filled with an electrically non-conducting material selected from the group consisting of polymer and epoxy resin, reinforced epoxy resin. A reinforcing structure (RS) disposed at a location of the slit (S) to reinforce the metal layer (ML).

When properly oriented with respect to the transponder chip module, the coupling frame may enhance communication (including power transfer) between an external contactless reader and the RFID chip (IC) of the transponder chip module. This may be due to the slit or slot in the coupling frame forcing eddy currents in the coupling frame in one direction around the antenna structure (module antenna) of the transponder chip module, thus inducing voltage into the module antenna which provides the power delivery to the chip.

US 20150136858 discloses a collective coupling enhanced (CCE) transponder chip module (TCM) comprises an RFID chip (CM, IC), optionally contact pads (CP), a module antenna (MA), and a coupling frame (CF), all on a common substrate or module tape (MT). The coupling frame (CF, 320A) may be in the form of a ring, having an inner edge (IE), an outer edge IE, 324) and a central opening (OP), disposed closely adjacent to and surrounding a module antenna (MA) structure of the transponder chip module (TCM). A slit (S, 326) may extend from the inner edge (IE) to the outer edge (OE) of the coupling frame (CF) so that the coupling frame (CF) is "open loop". An RFID device may comprise a transponder chip module (TCM) having a module antenna (MA), a device substrate (DS), and an antenna structure (AS) disposed on the device substrate (DS) and connected with the module antenna (MA). A portion of a conductive layer (CL) remaining after etching a module antenna (MA) may be segmented to have several smaller isolated conductive structures. Refer, for example, to FIGS. 3A-L, 4A, 4B, 5A, 5B thereof.

The Opening in the Coupling Frame

It is noteworthy that, in some of the figures of prior publications discussed above, such as FIGS. 2C and 2D of U.S. Pat. No. 9,475,086 there is typically a sizeable opening (module opening MO, central opening CO) in the body of the coupling frame to accommodate the transponder chip module, and the slit S in the coupling frame extends from the opening to an outer edge of the coupling frame. This was driven by the form factor of smart cards and the desire to keep the coupling frame as close as possible to the module antenna. The coupling frame was typically substantially coplanar with the module antenna, and typically surrounded it.

As disclosed herein, a coupling frame CF may be a planar (or non-planar, 3D) conductive element having an outer periphery (edge) and having a slit S extending from its outer edge to an inner location on the conductive element. In an RFID device, the coupling frame may be disposed (arranged) to overlap the transponder chip module, and may be oriented (arranged) so that the slit S overlaps (traverses over, or under) the turns (traces) of the module antenna on one side thereof. As distinguished from the coupling frames disclosed for example in U.S. Pat. No. 9,475,086, in the coupling frames disclosed herein the inner end of the slit S need not terminate in a distinct opening sized to accommodate the transponder chip module TCM. Essentially, it is the slit rather than the opening that dictates the electrical characteristics of the coupling frame. Some of the coupling frames disclosed herein may be non-planar, including curved or tubular.

FIG. 2C illustrates a collective-coupling enhanced (CCE) transponder chip module 210 comprising a collective coupling enhanced (CCE) transponder chip module (TCM) which may be referred to as a transponder chip module with an "integrated coupling frame". Contact pads CP for a contact interface (e.g., ISO 7816) may be disposed on the top (face-up) surface of the module tape. An RFID chip (IC) and a module antenna MA 212 which may be a planar antenna PA are disposed on the bottom (face-down) side of a module tape MT. A coupling frame (CF) 220 having slit (S, not visible in this view) may be disposed on the module tape, such as on the face-up side thereof so the slit of the coupling frame may overlap at least some of the turns of the module antenna (planar antenna). In this example, the coupling frame has a opening (OP) for allowing the contact pads CP to be disposed on the same side of the tape as the coupling frame. If contact pads are not needed (e.g., for a contactless-only smart card), the area otherwise occupied by contact pads could be occupied by more of the coupling frame, resulting for example in an entire top surface of the smart card being covered by a layer of metal (except for the slit).

In this example, the coupling frame (CF) closely adjacent to the module antenna, although not on the exact same plane as the module antenna, and both surrounds and overlaps the module antenna.

FIG. 2D shows a transponder chip module (TCM) 210 having an RFID chip (IC) and a module antenna (MA) 212. Additionally, the transponder chip module has a coupling frame 222 (compare FIG. 2C) which has a slit (S) 230, and which may be referred to as a "secondary" coupling frame (SCF). The tolerances of the secondary coupling frame can be closely controlled during the manufacture of the transponder chip module. The secondary coupling frame may be considered to be an "integrated coupling frame". The transponder chip module may be considered to be a collective coupling enhanced (CCE) transponder chip module (TCM) Also shown is that the secondary coupling frame may be electrically connected with an external coupling frame (CF). This concept may be applied to transponder chip module inserts which are inserted into payment objects, as disclosed herein.

The concept discussed, for example, in U.S. Pat. No. 9,475,086 of disposing a transponder chip module TCM in a metal component such as a metal card body MCB is extended herein to disposing one or more transponder chip modules (TCMs) in a metal component (such as a housing) of a payment object (such as a wristwatch).

In many of the examples and embodiments presented herein, coupling frames and transponder chip modules may be integrated into payment objects, which may also be referred to as "payment devices", or simply "devices".

Direct Capacitive (Electric) Coupling ("E-Fields")

Direct capacitive coupling of a transponder chip module to an external reader antenna may be achieved. Two electrodes, or capacitive plates (surfaces) may be connected to the RFID chip in a transponder chip module, which may then directly couple to reader antenna at the desired RF frequency (e.g. 13.56 MHz). In effect, the electrodes form an electromagnetic dipole when connected across the chip terminals. In this case the RFID chip may have a modified electronic circuitry in order to allow it to operate via capacitive coupling rather than inductive coupling to a reader antenna.

This concept may be applied to transponder chip modules as disclosed herein and implemented so that dipole electrodes may be substituted for the module antenna and interact with the coupling frame so that with the slit overlapping at least one of the dipole electrodes, contactless communication between the transponder chip module and a contactless reader may be enhanced (enabled), as described herein. The slit in the coupling frame may overlap both of the dipole electrodes to enable/enhance contactless communication. The coupling frame may be positioned so that its slit does not overlap the dipole electrodes to disable/suppress communications between the transponder chip module and the contactless reader (or other RFID device).

This concept may be extended to dipole electrodes in a transponder chip module (TCM) that couple with a booster antenna (such as in a conventional contactless smart card) that has been tuned such that the booster antenna/TCM pairing resonates at the desired frequency and allows communication with the external RFID reader. Some patents and publications of interest may include:
- U.S. Pat. No. 6,018,299 issued 2000 Jan. 25 to Eberhardt (Motorola)
- U.S. Pat. No. 6,107,920 issued 2000 Aug. 22 to Eberhardt et al. (Motorola)
- U.S. Pat. No. 6,147,605 issued 2000 Nov. 14 to Vega et al. (Motorola)
- U.S. Pat. No. 6,265,977 issued 2001 Jul. 24 to Vega et al. (Motorola)
- U.S. Pat. No. 6,611,199 issued 2003 Aug. 26 to Geizler et al. (Motorola)
- US 20130271265 (2013 Oct. 17; Finn)

Some Exemplary Dimensions

The following dimensions are approximate, and are presented to provide a sense of the relative scale of the various components of the transponder chip module and other elements of an RFID device which may be described herein.

A transponder chip module, including module antenna and RFIC chip—in other words, the module tape for the transponder chip module, may measure approximately 10 mm×10 mm, but may have other dimensions and form factors. For example, a transponder chip module may measure approximately 7 mm×15 mm, or 7 mm×24 mm. The module tape may be an epoxy-glass tape having a thickness of approximately 110 μm. A conductive layer (cladding or foil) on one or both sides of the module tape may have a thickness of approximately 18 μm or 30 μm.

The RFID chip may measure approximately 2.5 mm×2.5 mm, but may have other dimensions and form factors.

An etched module antenna may be disposed in a peripheral, rectangular annular area of the module tape having outer dimensions of approximately 10 mm×10 mm and inner dimensions of approximately 8 mm×8 mm, but may have other dimensions and form factors.

The traces of an etched module antenna may be formed by chemical or laser etching of a conductive layer on the module tape (or a conductive foil applied to the module tape), may have a width of approximately 100 μm, and the traces may be separated by spaces having a width of approximately 25 μm, but may have other dimensions and form factors.

A coupling frame (CF) may be generally rectangular, and measure approximately 20 mm×20 mm (having an area of approximately 400 mm$^2$), but may have other dimensions and form factors. For example, a coupling frame may measure approximately 7.5 mm×17.5 mm (131 mm$^2$) for an antenna measuring approximately 15 mm×7 mm (105 mm2). The coupling frame is generally larger than the antenna, such as twice as large or four times larger than the module antenna. The slit in the coupling frame may have a width of between approximately 1.4 mm and 2 mm, and may cover substantially all of the no-man's land at the interior of the module antenna. The slit, having traversed one side of the module antenna, may be wider than the no-man's land to overlap some inner turns of the antenna on adjacent sides of the module antenna. The slit may have an L-shape, a T-shape or other shape.

Some Examples of Coupling Frames

FIG. 3A illustrates the front side of a smartcard (SC) 300 which may be a metal card having a metal layer (ML), which may constitute substantially the entire thickness of the card body (CB) 302. The card body (CB) may have a module opening (MO) 308 wherein a transponder chip module (TCM) 310 may be disposed, and a slit (S) 330 extending from the module opening (MO) to the outer perimeter of the metal layer (ML) so that the metal card body (MCB) 302 may function as a coupling frame (CF) 320. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM).

The slit (S) may overlap at least a portion of the module antenna (MA, not shown) of the transponder chip module. In some examples and embodiments of coupling frames incorporated into RFID devices disclosed herein, there may not need to be an opening (MO) in the coupling frame (CF) for the transponder chip module (TCM).

This concept of modifying a metal element to have a slit (S) to function as a coupling frame (CF) may be applied to other products which may have an antenna module (AM) or transponder chip module (TCM) integrated therewith, such as watches, wearable devices, and the like.

The slit (S) may extend completely (fully) through the metal layer (ML) forming the coupling frame (CF). The slit (S) may extend only partially through the metal layer, and remaining material of the metal layer below the slit (S) may have a thickness below a transparency threshold or skin depth for the metal layer. The slit (S) may have a width which is smaller than the opening. The slit (S) may be at least partially filled with an electrically non-conducting material selected from the group consisting of polymer and epoxy resin, reinforced epoxy resin. A reinforcing structure (RS) may be disposed at a location of the slit (S) to reinforce the metal layer (ML).

An activation distance for a transponder chip module (TCM) disposed in (or under, or above) the opening (MO) of the coupling frame may be at least 20 mm; at least 25 mm; at least 30 mm; at least 35 mm; up to 40 mm; and more than 40 mm.

FIG. 3B illustrates the back (reverse) side of the smartcard 300 shown in FIG. 3A. A recessed area 302 may be provided on the reverse side of the card body (CB) to accommodate a magnetic stripe, and may measure approximately 9 mm×84 mm Another recessed area 304 may be provided on the reverse side of the card body (CB) to accommodate a signature panel, and may measure approximately 9 mm×56 mm. The module opening (MO) is shown in dashed lines, and may measure approximately 11 mm×13 mm (for an 8 contact module).

An additional recessed area 306 may be provided on the reverse side of the card body (CB) to accommodate a switch (SW) 324, such as a slide switch, and may measure 5 mm×20 mm. The switch (SW) may be used to selectively connect/disconnect the ends of the open loop coupling frame (CF) to one another, so that when the ends are connected, the coupling frame (CF) 320 is a closed loop and does not provide the advantages of an open loop coupling frame (CF) as described above. This allows a user to "switch off" the coupling frame feature and its attendant increase in activation distance, which provides more security (an anti-phishing feature) for the user's card. Shorting out the slit (S) may substantially suppress (including disable) communication between the transponder chip module and another RFID device such as a contactless reader. The switch may comprise any conductive medium (such as a tab or a membrane) capable of selectively short-circuiting the slit. As disclosed herein, a second coupling frame in intimate contact with a first coupling frame can act as a switch, when moved so that it short circuits the slit in the first coupling frame.

The switch feature can be integrated into a solid metal card body construction or a plastic card/metal foil card body construction. The switch may comprise a slide switch, a press button switch or the like which can be used to short-circuit the coupling frame (CF) and dampen the function of the transponder chip module (TCM), thereby providing protection against phishing (unauthorized reading of the smartcard). The switch (SW) can also have the function of reinforcing the structure of the card body (CB) around the position of slot or slit, protecting it from damage resulting from bending.

A switch SW can be incorporated in other RFID devices disclosed herein to short out the slit, slot or gap in the coupling frame. The switch may comprise a slide switch, a press button switch or the like which can be used to short-circuit the coupling frame and dampen the function of the transponder chip module, thereby providing protection against phishing (unauthorized reading of the smartcard). The switch can also have the function of reinforcing the structure of a card body around the position of the slit, protecting it from damage resulting from bending.

LEDs

U.S. Pat. No. 9,475,086 and US 20150021403 show (refer to FIG. 7A therein) incorporating an LED into a smart card (SC), and connecting it to the ends of the coupling frame (CF). The LED is shown as being connected across the slit (S), and may illuminate when the smartcard (SC) is being interrogated by an external reader.

A coupling frame may feature connection to LED in combination with a switch or second coupling frame. The LED will light or blink when the switch is open (open slit) and the device is placed in proximity with an RF reader field at the operating frequency (e.g. 13.56 MHz). When the coupling frame slit is shorted out, the LED will not light giving a visual indication to the user that the device has been disabled and that no data communication can occur with the transponder chip module.

The Slit, or Discontinuity

The operation of a coupling frame (CF) benefits from the presence of an electrical discontinuity, herein described as a slit (S), extending into the surface of and across the coupling frame from an outer edge thereof, so that the coupling frame is not a closed loop. The discontinuity in the coupling frame (CF) may be implemented by creating an electrically insulating region in the metal layer, nanomaterial or other conductor of the coupling frame (CF). The discontinuity may be formed by a series of perforations. The discontinuity may also be formed by selective chemical (or other) modification of the metal, nanomaterial or other conductor, resulting in a non-conductive stripe rather than a slit through the surface of the coupling frame. The chemical modification may form an electrically insulating region on the coupling frame (CF) which serves as the discontinuity. For example, the discontinuity may be formed by selective oxidation of the coupling frame (CF) by deposition (for example by screen printing, inkjet) of a corrosive chemical (for example acid). For example, a coupling frame formed from a thin foil of aluminum may have a non-conductive stripe (NCS) formed therein, such as by anodising. See, for example US 20100078329 (Mirsky et al.).

As used herein, "slit" includes any kind of electrical discontinuity or non-conductive path extending from an outer edge of the conductive coupling frame to an inner position thereof, rendering it "open loop". The slit may extend over at least some of the turns of the module antenna (MA) of the transponder chip module (TCM), including all of the turns on one side of the module antenna (MA), and beyond that into the no-man's land in an interior area of the module antenna (MA), and may extend further over some turns of the antenna on other sides of the antenna. The slit may extend to an opening (MO) in the coupling frame (CF) for receiving a transponder chip module (TCM) or the mold mass (MM) thereof.

A discontinuity which is a slit (S) may compromise the mechanical integrity of the otherwise continuous coupling frame, which may necessitate the presence of a backing member (such as a module tape, or inlay substrate). A slit (S) can be filled with a material to restore some of the mechanical integrity to the metal layer of the coupling frame, and may also add to the aesthetic appearance of the coupling frame (if it is visible in the final product). The material may be electroluminescent, so that it changes appearance when the coupling frame (and overall device) is in proximity with an external reader. A patch may extend across the slit of the coupling frame. A discontinuity wherein a narrow region or "stripe" of the metal layer of the otherwise electrically conductive coupling frame is converted (chemically, or otherwise) to a material (such as an oxide of the metal) that is electrically non-conductive may serve the same purpose as the slit, but without compromising the mechanical integrity of the coupling frame. This may be important in situations where the coupling frame comprises a mechanical element of an overall device, such as the housing of a wristwatch.

Other solutions which address restoring mechanical integrity to a coupling frame with a slit are presented herein, and may comprise stacking two or more coupling frames (CF-1, CF-2 . . . CF-n), one atop the other, with one or more insulating layers (such as adhesive, or simply an oxidation layer) therebetween, and with their respective slits (S1, S2 . . . Sn) being oriented differently than one another, such as 90° or 180° apart from one another, so that the slits are not aligned on top of one another. (If the stacked coupling frames were not insulated from each other, they could short out each other's slits, compromising the function of the coupling frames.) Such a laminated construction of an overall coupling frame having multiple (two or more) coupling frame layers may exhibit superior mechanical integrity, and may also contribute to an aesthetic appearance of the overall device. Different materials may be used for the different layers, which may also provide additional benefits.

FIG. 3C illustrates a design of a hybrid metal credit card (or smart card) 300. The card body (CB) 302 is largely composed of metal (and may be referred to as a metal card body MCB), this may be a precious or high density metal such as silver, titanium, tungsten or a high strength metal such as stainless steel, and may comprise a non-precious metal plated with a precious metal. The card body (CB) features a slit (S, dashed lines) 330 extending from an edge of the card body (CB) through the position of the transponder chip module (TCM) 310 so that the slit overlaps the module antenna thereof and the card body (CB) functions as a coupling frame (CF) 320. The metal card body (CB, MCB) may have one or more recesses 342, 344 in the front and/or rear face of the card. These recesses may be filled with implanted or laminated non-conductive filler materials such as ceramic, plastic, glass, wood etc. The filled recesses may be, for example, 50% of the depth of the card thickness. These filled recesses serve as decorative elements on the card. In particular at the module position they serve to conceal the slit (S) in the card and allow a neat implanting of the module into the card body. In addition, the use of a recess filled with non-conductive material surrounding the transponder chip module may mitigate the effects of electrostatic discharge (ESD) when inserting the card into payment terminals or ATM machines, as the fill material for the recess may have a high dielectric constant and hence protect the transponder chip module from static discharges.

FIG. 3D illustrates a design of a hybrid ceramic and metal smart card (SC) 300. The card body (CB) 302 may be made of solid metal and feature a slit (S) 330 at the position of the transponder chip module (TCM) 310. The card body with slit may function as a coupling frame (CF) 320, with the slit overlapping the module antenna of the transponder chip module. The metal card body may feature a recess that may cover most of the size of the card and extend around the slit position to the periphery of the card. This recess may be filled by gluing or laminating a moulded or cut ceramic insert 304. This allows the card to retain the mechanical strength of the metal (e.g. stainless steel, titanium, tungsten) and have the aesthetic appearance and appeal of a polished ceramic finish.

A Smartcard Lay-Up

FIG. 4A illustrates an embodiment of a smartcard 400A having a multiple coupling frame stack-up. Here, there are two coupling frames (CF-1, CF-2) 421, 422 in different layers of the card body (CB), separated by a layer 423 of non-conductive material (such as PVC). The stack-up comprises a front face card layer 424, a first coupling frame (CF-1) 421, an internal card dielectric layer 423, a second coupling frame (CF-2) 422 and a rear face card layer 426. The first coupling frame (CF-1) surrounds the top, left and bottom edges of the transponder chip module (TCM) 410, and extends to the top, left and bottom edges of the card body (CB), and has a module opening (MO-1). The second coupling frame (CF-2) surrounds the top, right and bottom edges transponder chip module (TCM), and extends to the top, right and bottom edges of the card, and has a module opening (MO-2). In aggregate, the first and second coupling frames (which may be referred to as "420") cover nearly the entire surface of the card body 402 (less the area of the transponder chip module TCM). An activation distance of 40 mm was achieved.

Some Additional Embodiments of Smart Cards

The transponder chip modules (TCM) shown in the following figures (FIGS. 5, 6, 7) may be dual-interface (contact and contactless) modules, and may be referred to as antenna modules (AM). If the module has no antenna, and a contact interface only, it would be referred to as a single-interface module.

Some dimensions are set forth for components of smart cards described in the following figures (FIGS. 5, 6, 7). All dimensions should be considered to be approximate.

Various multi-layer smart card constructions are shown. An inner layer may be referred to as an interlayer.

The outer (front and rear) layers may comprise a conductive magnetic or electromagnetic transparent material (at the reader frequency), such as sputtered, flake, wire, nano, metal. The card front and rear may be an alternative colour or pattern and may be composed of one of a number of suitable materials. Metal may be used in the construction of the card front and/or rear layers if the metal is electromagnetic transparent at the reader operational frequency (e.g. 13.56 MHz for RFID applications). An example of this is a commonly used decorative aluminium coating sputtered onto clear plastic. This material typically uses metal coatings with thickness approximately 10 nm to give an iridescent or holographic effect when laminated into the card stackup. This material with metal coating may be used as a layer of the card construction without the use of a slit (without a coupling frame layer) at the TCM position as the metal conductive EM-transparent layer is transparent to the electromagnetic field.

A booster antenna may be incorporated into some of the constructions or alternative constructions.

Metal layers with slits may be incorporated as coupling frames into the lay-up of smartcards. Metal layers without slits may be incorporated as stiffeners into the lay-up of smartcards.

FIG. 5

A transponder chip module (TCM) is shown positioned above a smart card body comprising:
 a card front layer
 a metal interlayer having a slit to function as a coupling frame
 a card rear layer This construction uses a 300 μm front layer with opening for the TCM. The front layer may be made from non-conductive or electromagnetic transparent materials.

The metal interlayer (coupling frame) has thickness in the range 100 μm to 150 μm and features a slit of width typically greater than 200 μm extending from the edge of the metal interlayer to the opening for the TCM. The opening in the interlayer dictates the overlap of the interlayer with the module antenna (MA) and is optimised to maximise the RF performance of the card when communicating with a reader. The metal interlayer acts as a reinforcing structure for the card and can be chosen to increase the weight of the card by using a high density metal or metal alloy. The use of an optimally designed slit and cavity in the metal interlayer enhances the performance of the TCM by coupling induced eddy currents in the interlayer to the module antenna (MA).

The rear layer may have a thickness of 300 μm and features an optional recess to accommodate the structures on the rear side of the TCM that include the IC, wire bond connections and encapsulation. Depending on the design thickness of the TCM a recess in the rear layer may be omitted. Not shown are adhesive layers between each layer with thickness typically in the range 10 μm to 25 μm.

In the coupling frame layers shown herein (FIGS. 5, 6, 7), the opening in the coupling frame layer is typically smaller than the opening in the top (front layer) to ensure that the slit in the coupling frame overlaps the module antenna in the transponder chip module. Compare FIGS. 2A,2B, which more clearly show how the transponder chip module has a larger portion with the module antenna at the front (top) of the card, below which is a smaller portion (mold mass encapsulating the RFID chip). The transponder chip module may be shown only generally in FIGS. 5, 6, 7.

FIG. 6

This construction features a 200 μm front layer.

The structure features two metal interlayers (coupling frames) each with thickness in the range 100 μm to 150 μm and features a slit of width typically greater than 200 μm extending from the edge of the metal interlayer to the opening for the TCM.

The front layer and metal interlayer 1 feature an opening to accommodate the TCM. Metal interlayer 2 features an opening that allows for the overlap of the interlayer with the module antenna (MA) and is optimised to maximise the RF performance of the card when communicating with a reader. The two interlayers may be laminated to each other prior to assembly of the remainder of the card. The two interlayers may be made from different metals in order to optimise the properties (e.g. stiffness, weight) of the two interlayers when laminated together.

Metal Layer 1 is not a coupling frame, it is a metal (stiffening) layer with an opening for the transponder chip module.

Metal Layer 2, is a coupling frame, with a slit, and an opening which allows overlap of the slit with the module antenna of the transponder chip module (or antenna module).

The rear layer may have a thickness 200 micron. Depending on the design thickness of the TCM a recess in the rear layer may be omitted. Not shown are adhesive layers between each layer with thickness typically in the range 10 μm to 25 μm.

FIG. 7

This construction may feature a 300 μm front layer made from a non-conductive or electromagnetic transparent material.

The structure features one metal interlayer (coupling frame) with thickness 200 μm and features a slit of width typically greater than 200 μm extending from the edge of the metal interlayer to the opening for the TCM.

The front layer features an opening to accommodate the larger, top portion of the TCM.

The metal interlayer features a smaller opening allowing for overlap of the slit in the interlayer with the module antenna (MA) and is optimised to maximise the RF performance of the card when communicating with a reader.

The rear of the card is composed of metal and has thickness 200 micron. The rear layer may feature a cut-out at the module position that is filled by an insert made of non-conductive or electromagnetic transparent material. Depending on the design thickness of the TCM a recess in the rear insert may be omitted. Not shown are adhesive layers between each layer with thickness typically in the range 10 μm to 25 μm.

While the invention(s) has/have been described with respect to a limited number of embodiments, these should not be construed as limitations on the scope of the invention (s), but rather as examples of some of the embodiments. Those skilled in the art may envision other possible variations, modifications, and implementations that are also within the scope of the invention(s), and claims, based on the disclosure(s) set forth herein.

What is claimed is:

1. Smartcard comprising:
a transponder chip module (TCM) comprising an RFID chip (IC) and a module antenna (MA) having two ends connected with two terminals of the RFID chip (IC); and
a card body (CB) comprising multiple layers, wherein:
a first layer of the card body comprises a first coupling frame (CF-1) having a first opening (MO-1) surrounding a top, a left and a bottom edges of the transponder chip module (TCM); and
a second layer of the card body comprises a second coupling frame (CF-1) having a second opening (MO-2) surrounding the top, a right and the bottom edges transponder chip module (TCM).

2. The smartcard of claim 1, further comprising:
a layer of non-conductive material separating the first and second coupling frames.

3. The smartcard of claim 1, wherein:
the first coupling frame (CF-1) extends to a top edge, a left edge and a bottom edge of the card body (CB).

4. The smartcard of claim 3, wherein:
the second coupling frame (CF-2) extends to a top edge, a right edge and a bottom edge of the card body (CB).

5. The smartcard of claim 4, wherein:
in aggregate, the first and second coupling frames over nearly the entire surface of the card body.

6. The smartcard of claim 1, wherein:
the transponder chip module has contact pads for a contact interface.

7. The smartcard of claim 1, wherein:
the transponder chip module is passive, harvesting power from an external reader.

8. The smartcard of claim 1, wherein:
the module antenna comprises a planar antenna comprising a single long conductive track laid out in a spiral pattern.

9. The smartcard of claim 1, wherein:
the transponder chip module comprises a module taupe (MT); and
the module antenna is disposed on a same side of the module tape as the RFID chip.

10. The smartcard of claim 9, further comprising:
contact pads (CP) disposed on an opposite side of the module tape as the RFID chip.

* * * * *